(12) United States Patent
Chen

(10) Patent No.: US 7,321,402 B1
(45) Date of Patent: Jan. 22, 2008

(54) APPARATUS AND METHOD FOR COMPONENT VIDEO SIGNAL CONVERSION

(75) Inventor: Dongwei Chen, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 515 days.

(21) Appl. No.: 10/940,510

(22) Filed: Sep. 13, 2004

(51) Int. Cl.
*H04N 9/67* (2006.01)
*H04N 11/20* (2006.01)

(52) U.S. Cl. ...................................... 348/659; 348/453

(58) Field of Classification Search ........ 348/659–661, 348/453, 649; 345/603, 604
See application file for complete search history.

(56) References Cited

U.S. PATENT DOCUMENTS

| | | | |
|---|---|---|---|
| 6,754,399 B2* | 6/2004 | Pettigrew et al. ............ | 382/276 |
| 6,757,425 B2* | 6/2004 | Pettigrew et al. ............ | 382/162 |
| 6,870,522 B2* | 3/2005 | Sagano et al. .............. | 345/75.2 |
| 7,009,660 B2* | 3/2006 | Kim ........................... | 348/558 |
| 2002/0163970 A1* | 11/2002 | Nishio et al. .......... | 375/240.26 |

* cited by examiner

*Primary Examiner*—Victor R. Kostak
(74) *Attorney, Agent, or Firm*—Vedder, Price, Kaufman & Kammholz, P.C.

(57) ABSTRACT

Apparatus and method for converting a Y-Pb-Pr component video signal to a R-G-B component video signal. A luminance component video (Y) signal and a red color difference component video (Pr) signal are decoded to produce a red component video (R) signal. The Y signal, a blue color difference component video (Pb) signal and the Pr signal are decoded to produce a green component video (G) signal. The Y and Pb signals are decoded to produce a blue component video (B) signal.

15 Claims, 4 Drawing Sheets

APPARATUS AND METHOD FOR COMPONENT VIDEO SIGNAL CONVERSION

BACKGROUND OF THE INVENTION

1. Field of the Invention

The present invention awaits to analog video signal circuits, and in particular, to analog video signal circuits for converting color component video signals.

2. Description of the Related Art

As is well known in the art, color video signals are typically generated as three component video signals representing the three primary colors; red (R), green (G) and blue (B). The entire color spectrum can be represented by varying the relative intensities of these three colors. Similarly, color display devices typically, at least internally, require these three signals R, G, B for driving the actual display device, such as a cathode ray tube (CRT), liquid crystal display (LCD), digital light processor (DLP) and others. Accordingly, it would seem logical to convey these three color signals R, G, B from the signal source to the display device, e.g. via a VHF/UHF broadcast, cable or satellite signal, or a color signal storage medium such as video tape or digital video disc (DVD).

However, such color signals R, G, B, often referred to as a single component video signal RGB have two disadvantages associated with them. First, such signals have very high bandwidth, which can be particularly problematic in a broadcast environment. Second, the black and white, or luminance, picture information is combined within the color signals. These disadvantages are typically addressed by converting the original RGB signal into another type of color component signal which is often referred to as a YPbPr signal. As is well known, the Y component of this signal is the black and white picture information, also known as luminance, contained within the original RGB signal. The Pb and Pr signals are color difference signals which are mathematically derived from the original RGB signal.

All of these signals have relative values defined by coefficients established according to the EIA/CEA 770.2-C specification, entitled "Standard Definition TV Analog Component Video Interface". This standard defines the physical characteristics of an interface and the parameters of the signals carried across that interface using three parallel channels for the interconnection of equipment operating with analog component video signals. Such signals and their coefficients can be represented by the following equations.

$$Y=0.299R+0.587G+0.114B$$

$$B-Y=-0.299R-0.587G+0.886B$$

$$R-Y=0.201R-0.587G-0.114B$$

$$Pb=(B-Y)/1.772$$

$$Pr=(R-Y)/1.402$$

Referring to FIG. 1, using the foregoing equations, a straightforward component video signal conversion circuit for decoding the Y, Pb and Pr signals into the corresponding R, G and B signals can be implemented as shown. Amplifier A1 multiplies the Pb signal by the normalized factor of 1.772 to produce the normalized color difference B−Y signal to which the original Y signal is added, thereby producing the B signal. Similarly, amplifier A2 multiplies the Pr signal by the normalized factor of 1.402 to produce the red color difference signal R−Y to which the Y signal is added, thereby producing the R signal. For the G signal, the recreated B and R signals are multiplied in amplifiers A3 and A4 by the normalized factors of 0.194 and 0.509, respectively. The signals produced by amplifiers A3 and A4 are subtracted from the Y signal to produce the G signal.

For purposes of converting the Y, Pb and Pr component signals back to the original R, G and B component signals, these equations can be simplified to the following equations.

$$R=Y+1.402Pr$$

$$G=Y-0.344Pb-0.714Pr$$

$$B=Y+1.772Pb$$

While the conversion circuitry of FIG. 1 is simple, when implemented in integrated circuit (IC) form, particularly circuits which use complementary metal oxide semiconductor (CMOS) transistors and processes, the absolute values of the resistors and capacitors needed to form such circuitry, particularly the amplifiers, can experience changes by as much as +/−20%. Accordingly, using the circuitry of FIG. 1 as an example, while it may be possible to maintain reasonably accurate conversion results for the R and B signals, the accuracy of the conversion process for the G signal, which has more complicated signal paths for the various signals used to generate the G signal, will likely experience significant conversion degradation, particularly over variations in PVT, i.e., fabrication processes (P), power supply voltage (V), and operating temperature (T).

SUMMARY OF THE INVENTION

In accordance with the presently claimed invention, an apparatus and method are provided for converting a Y-Pb-Pr component video signal to a R-G-B component video signal. A luminance component video (Y) signal and a red color difference component video (Pr) signal are decoded to produce a red component video (R) signal. The Y signal, a blue color difference component video (Pb) signal and the Pr signal are decoded to produce a green component video (G) signal. The Y and Pb signals are decoded to produce a blue component video (B) signal.

In accordance with one embodiment of the presently claimed invention, circuitry for converting a Y-Pb-Pr component video signal to a R-G-B component video signal includes signal electrodes and decoding circuitry. First, second and third input signal electrodes are to convey a luminance component video (Y) signal, a blue color difference component video (Pb) signal and a red color difference component video (Pr) signal, respectively. First, second and third output signal electrodes are to convey a red component video (R) signal, a green component video (G) signal and a blue component video (B) signal, respectively. First signal decoding circuitry is coupled between the first and third input signal electrodes and the first and third output signal electrodes, and responsive to the Y and Pr signals by providing the R signal. Second signal decoding circuitry is coupled between the first, second and third input signal electrodes and the first, second and third output signal electrodes, and responsive to the Y, Pb and Pr signals by providing the G signal. Third signal decoding circuitry is coupled between the first and second input signal electrodes and the first and second output signal electrodes, and responsive to the Y and Pb signals by providing the B signal.

In accordance with another embodiment of the presently claimed invention, circuitry for converting a Y-Pb-Pr component video signal to a R-G-B component video signal includes: first signal decoder means for receiving decoding a luminance component video (Y) signal and a red color difference component video (Pr) signal and in response thereto generating a red component video (R) signal; second signal decoder means for receiving and decoding the Y signal, a blue color difference component video (Pb) signal and the Pr signal and in response thereto generating a green component video (G) signal; and third signal decoder means for receiving and decoding the Y and Pb signals and in response thereto generating a blue component video (B) signal.

In accordance with still another embodiment of the presently claimed invention, a method for converting a Y-Pb-Pr component video signal to a R-G-B component video signal includes:

receiving a luminance component video (Y) signal;

receiving a blue color difference component video (Pb) signal;

receiving a red color difference component video (Pr) signal;

decoding the Y and Pr signals to produce a red component video (R) signal;

decoding the Y, Pb and Pr signals to produce a green component video (G) signal; and decoding the Y and Pb signals to produce a blue component video (B) signal.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators.

Figure 1:
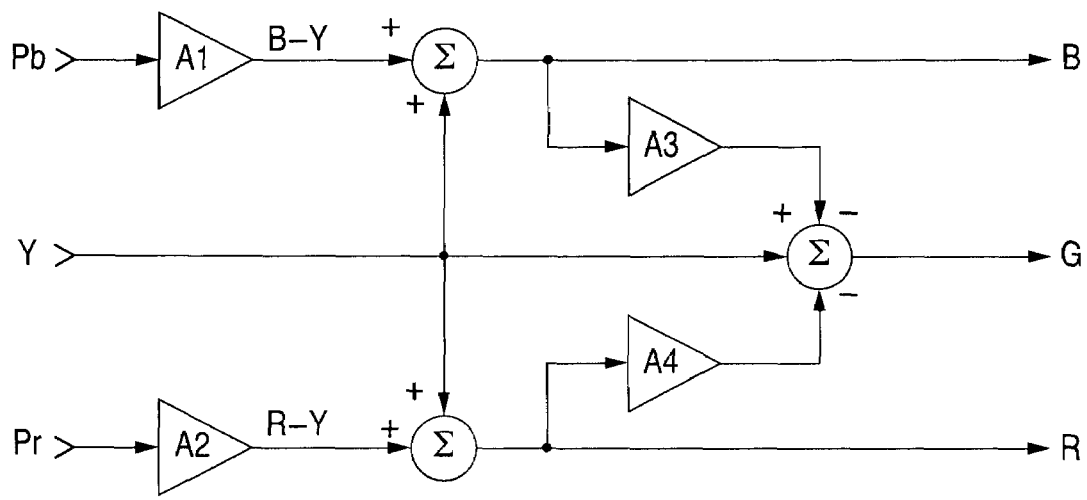
FIG. 1 is a functional block diagram of one possible conversion circuit for converting a YPbPr component video signal to a RGB component video signal.
Figure 2:
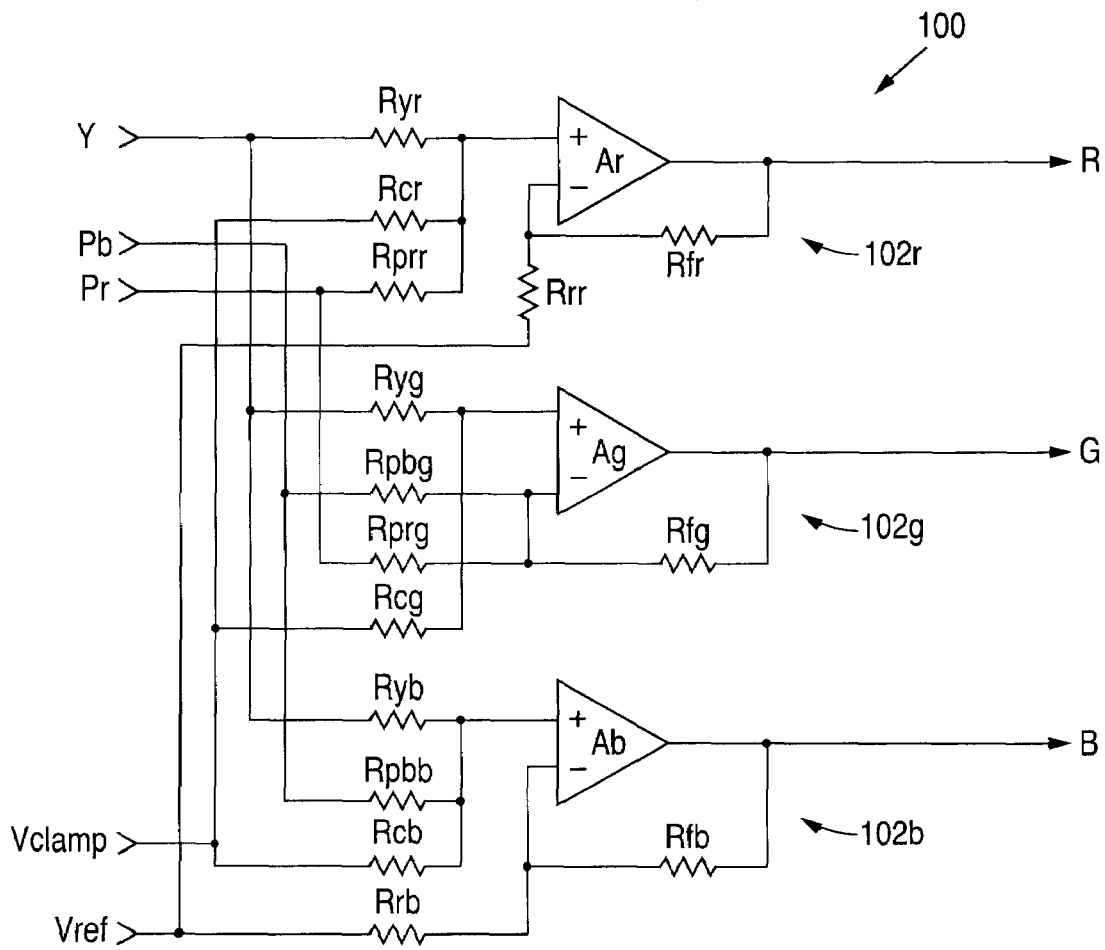
FIG. 2 is a schematic diagram of circuitry for converting a YPbPr component video signal to a RGB component video signal in accordance with one embodiment of the presently claimed invention.

Referring to FIG. 2, in accordance with the presently claimed invention, a YPbPr component video signal can be converted to a RGB component video signal using analog circuitry in which significant variations in the absolute values of the passive circuit components can be tolerated. Since the relative values of passive circuit components can be maintained with significant accuracies, e.g., to 10-bit accuracies without trimming, accurate signal conversion can be achieved by converting such signals in a manner in which the same passive circuit components are used as part of the conversion process for multiple signals, thereby causing effects of variations in component values to cancel one another. For example, the conversion coefficient for the Pr signal when recreating the R signal, i.e., 1.402, can be approximated as the integer ratio 7/5 for a 10-bit accuracy. Similarly, the other conversion coefficients can be approximated as indicated in the equations below.

$$R=Y+(7/5)Pr$$

$$G=Y-(21/61)Pb-(5/7)Pr$$

$$B=Y+(101/57)Pb$$

Referring to FIG. 2, these conversion coefficients are realized in the implementation of the various input and feedback resistors for the R signal conversion sub-circuit 102r, the G signal conversion sub-circuit 102g and the B signal conversion sub-circuit 102b. As should be readily understood by one of ordinary skill in the art, this interconnection of resistances around the differential amplifiers Ar, Ag, Ab serve as voltage dividers for the incoming Y, Pb and Pr signals. Additional DC bias voltages are used in the form of a clamp voltage Vclamp for clamping the video signals, and a reference voltage Vref providing the reference potential for R, G and B signals in accordance with the requirements of the subsequent, i.e., downstream, display driving circuitry (not shown).

For example, using the R signal conversion sub-circuit 102r as an example, the Y and Pr signals, via their input resistances Ryr and Rprr, respectively, drive the non-inverting input of the differential amplifier Ar. The inverting input of the amplifier Ar is biased by the reference voltage Vref via its resistance Rrr, and receives a feedback signal via feedback resistor Rfr. In accordance with well known operational amplifier principles, the output R signal will be determined by the net input signal voltage multiplied by the gain. The net input signal voltage is the sum of a voltage-divided Y-signal component and a voltage-divided Pr-signal component. In accordance with well known voltage divider principles, the voltage-divided Y-signal component is that which appears across the net resistance of the parallel combination of resistors Rcr and Rprr. Similarly, the voltage-divided Pr-signal component is that which appears across the net resistance of the parallel combination of resistors Ryr and Rcr. The gain of this sub-circuit 102r is the sum of unity and the feedback resistor ratio Rfr/Rrr. The operations of the G signal conversion sub-circuit 102g and B signal conversion sub-circuit 102b are similar, with voltage division of the input signals Y, Pb, Pr determined by the input resistances Ryg, Rpbg, Rcg, Ryb, Rpbb, Rcb, and circuit gains as determined by the feedback circuit resistances Rfg, Rprg, Rfb, Rrb.

Based upon the foregoing, it should be readily seen that the absolute values of the various input and feedback resistances are not critical. Instead, it is the relative values of these resistances which are important for purposes of establishing the appropriate voltage division ratios and gain factors. Further, since each sub-circuit 102r, 102g, 102b processes, e.g., decodes, its respective input signals Y, Pb, Pr jointly, changes in absolute values of the passive components will be uniform and universal, thereby causing the conversion sub-circuits 102r, 102g, 102b to track each other in terms of their respective performance (e.g., voltage division ratio and gain) variations. In other words, particularly in an IC environment, variations in absolute values of passive circuit components due to factors such as fabrication process, power supply voltage or operating temperature, will affect all circuit components in a substantially similar manner, thereby having little effect on the accuracy of the output signals R, G, B.

Figure 3A:
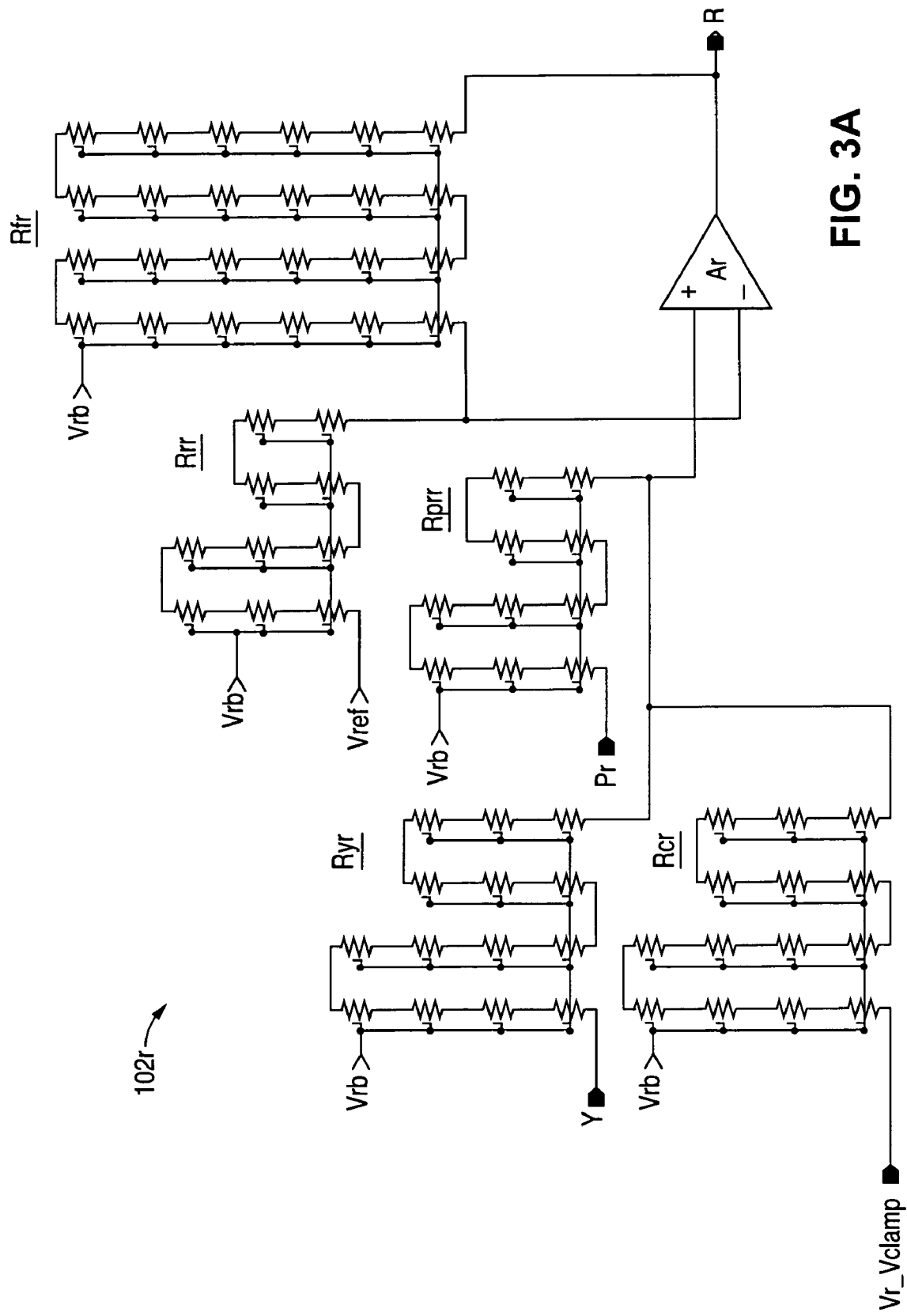
FIGS. 3A and 3B and 3C are schematic diagrams of example embodiments of the R, G and B conversion sub-circuits of the conversion circuitry of FIG. 2 for implementation in an integrated circuit environment.
Figure 3B:
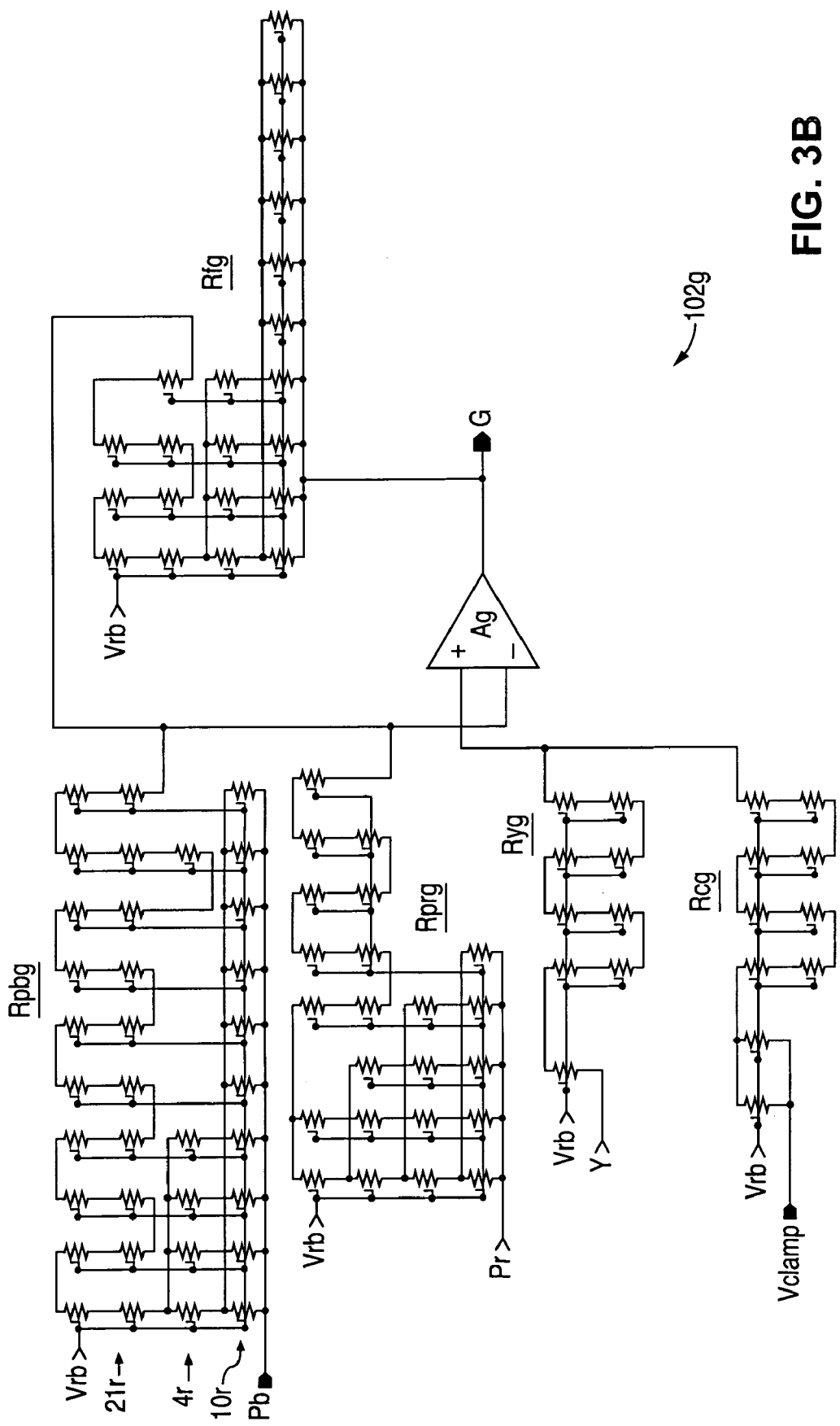
Figure 3C:
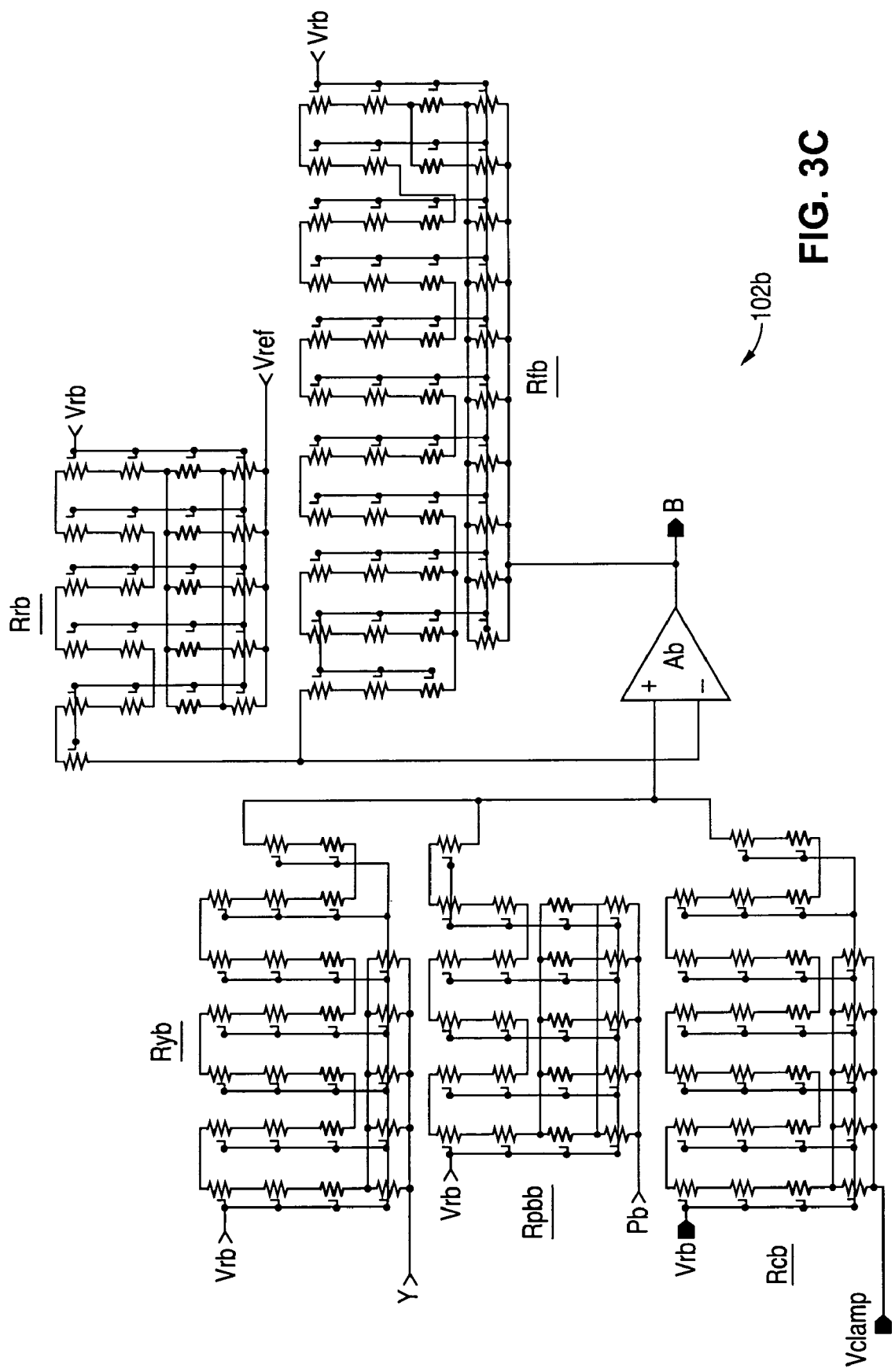

Referring to FIGS. 3A, 3B and 3C, the R signal 102r, G signal 102g and B signal 102b conversion sub-circuits can be implemented as part of an integrated circuit as shown. In accordance with well known passive circuit component implementation techniques, the resistors are implemented as MOS transistors with the drain and source electrodes forming the two electrodes of the resistance and the gate electrodes biased by a fixed DC voltage Vrb. (As will be readily understood, such bias voltage Vrb has a value which, in conjunction with the device dimensions and other characteristics of the subject MOS transistors, determines the resistance of each individual resistor.) By connecting these resistances together in various series and parallel combinations, specific normalized values of resistances can be obtained so as to achieve the conversion coefficients as described above.

For example, with reference to the R signal conversion sub-circuit 102r as depicted in FIG. 3A, the input resistance Ryr associated with the input Y signal is formed by connecting 14 such resistances in series, thereby creating a resistance value of 14R. Similarly, the resistance Rprr associated with the input Pr signal is formed by a set of 10 such resistances to produce a normalized resistance value of 10R.

More complex resistance values can also be realized. For example, with reference to FIG. 3B, the resistance Rpbg associated with the input Pb signal uses a set of 35 such resistances to implement a normalized resistance value of 21.35R by connecting the following resistance combinations in series: 21 resistances 21r connected in series; 4 resistances 4r connected in parallel; and 10 resistances 10r connected in parallel.

Based upon the foregoing examples, the series and parallel combinations of various resistances for the remaining input and feedback resistances should be readily understood. This, in conjunction with well known conventional voltage divider and operational amplifier circuit principles, will illustrate the operations of these conversion sub-circuits 102r, 102g, 102b, as discussed above.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including circuitry for converting a Y-Pb-Pr component video signal to a R-G-B component video signal, comprising:

first, second and third input signal electrodes to convey a luminance component video (Y) signal, a blue color difference component video (Pb) signal and a red color difference component video (Pr) signal, respectively;

first, second and third output signal electrodes to convey a red component video (R) signal, a green component video (G) signal and a blue component video (B) signal, respectively;

first signal decoding circuitry including a first shared scaling circuit and coupled between said first and third input signal electrodes and said first output signal electrode to decode said Y and Pr signals jointly via said first shared scaling circuit and provide said R signal;

second signal decoding circuitry including a second shared scaling circuit and coupled between said first, second and third input signal electrodes and said second output signal electrode to decode said Y, Pb and Pr signals jointly via said second shared scaling circuit and provide said G signal; and third signal decoding circuitry including a third shared scaling circuit and coupled between said first and second input signal electrodes and said third output signal electrode to decode said Y and Pb signals jointly via said third shared scaling circuit and provide said B signal.

2. An apparatus including circuitry for converting a Y-Pb-Pr component video signal to a R-G-B component video signal, comprising:

first, second and third input signal electrodes to convey a luminance component video (Y) signal, a blue color difference component video (Pb) signal and a red color difference component video (Pr) signal, respectively;

first, second and third output signal electrodes to convey a red component video (R) signal, a green component video (G) signal and a blue component video (B) signal, respectively;

first signal decoding circuitry coupled between said first and third input signal electrodes and said first output signal electrode, and responsive to said Y and Pr signals by providing said R signal;

second signal decoding circuitry coupled between said first, second and third input signal electrodes and said second output signal electrode, and responsive to said Y, Pb and Pr signals by providing said G signal; and third signal decoding circuitry coupled between said first and second input signal electrodes and said third output signal electrode, and responsive to said Y and Pb signals by providing said B signal;

wherein
said first signal decoding circuitry comprises first signal scaling circuitry that jointly scales said Y and Pr signals to provide said R signal,
said second signal decoding circuitry comprises second signal scaling circuitry that jointly scales said Y, Pb and Pr signals to provide said G signal, and
said third signal decoding circuitry comprises third signal scaling circuitry that jointly scales said Y and Pb signals to provide said B signal.

3. The apparatus of claim 2, wherein:

said first signal scaling circuitry comprises first resistive input circuitry coupled to said first and third input signal electrodes, first amplifier circuitry coupled to said first resistive input circuitry, and first resistive feedback circuitry coupled to said first output signal electrode and said first amplifier circuitry;

said second signal scaling circuitry comprises second resistive input circuitry coupled to said first, second and third input signal electrodes, second amplifier circuitry coupled to said second resistive input circuitry, and second resistive feedback circuitry coupled to said second output signal electrode and said second amplifier circuitry; and said third signal scaling circuitry comprises third resistive input circuitry coupled to said first and second input signal electrodes, third amplifier circuitry coupled to said third resistive input circuitry, and third resistive feedback circuitry coupled to said third output signal electrode and said third amplifier circuitry.

4. The apparatus of claim 3, wherein:

said first amplifier circuitry comprises a first differential amplifier circuit;

said second amplifier circuitry comprises a second differential amplifier circuit; and said third amplifier circuitry comprises a third differential amplifier circuit.

5. The apparatus of claim 2, wherein:

said first signal scaling circuitry comprises first voltage divider circuitry coupled to said first and third input signal electrodes, and first amplifier circuitry coupled to said first voltage divider circuitry and said first output signal electrode;

said second signal scaling circuitry comprises second voltage divider circuitry coupled to said first, second and third input signal electrodes, and second amplifier circuitry coupled to said second voltage divider circuitry and said second output signal electrode; and said third signal scaling circuitry comprises third voltage divider circuitry coupled to said first and second input signal electrodes, and third amplifier circuitry coupled to said third voltage divider circuitry and said third output signal electrode.

6. The apparatus of claim 5, wherein:

said first amplifier circuitry comprises a first differential amplifier circuit;

said second amplifier circuitry comprises a second differential amplifier circuit; and said third amplifier circuitry comprises a third differential amplifier circuit.

7. An apparatus including circuitry for converting a Y-Pb-Pr component video signal to a R-G-B component video signal, comprising:

first, second and third input signal electrodes to convey a luminance component video (Y) signal, a blue color difference component video (Pb) signal and a red color difference component video (Pr) signal, respectively;

first, second and third output signal electrodes to convey a red component video (R) signal, a green component video (G) signal and a blue component video (B) signal, respectively;

first signal decoding circuitry coupled between said first and third input signal electrodes and said first output signal electrode, and responsive to said Y and Pr signals by providing said R signal;

second signal decoding circuitry coupled between said first, second and third input signal electrodes and said second output signal electrode, and responsive to said Y, Pb and Pr signals by providing said G signal; and third signal decoding circuitry coupled between said first and second input signal electrodes and said third output signal electrode, and responsive to said Y and Pb signals by providing said B signal;

wherein said first signal decoding circuitry comprises first resistive input circuitry coupled to said first and third input signal electrodes, first amplifier circuitry coupled to said first resistive input circuitry, and first resistive feedback circuitry coupled to said first output signal electrode and said first amplifier circuitry, said second signal decoding circuitry comprises second resistive input circuitry coupled to said first, second and third input signal electrodes, second amplifier circuitry coupled to said second resistive input circuitry, and second resistive feedback circuitry coupled to said second output signal electrode and said second amplifier circuitry, and said third signal decoding circuitry comprises third resistive input circuitry coupled to said first and second input signal electrodes, third amplifier circuitry coupled to said third resistive input circuitry, and third resistive feedback circuitry coupled to said third output signal electrode and said third amplifier circuitry.

8. The apparatus of claim 7, wherein:

said first amplifier circuitry comprises a first differential amplifier circuit;

said second amplifier circuitry comprises a second differential amplifier circuit; and said third amplifier circuitry comprises a third differential amplifier circuit.

9. An apparatus including circuitry for converting a Y-Pb-Pr component video signal to a R-G-B component video signal, comprising:

first, second and third input signal electrodes to convey a luminance component video (Y) signal, a blue color difference component video (Pb) signal and a red color difference component video (Pr) signal, respectively;

first, second and third output signal electrodes to convey a red component video (R) signal, a green component video (G) signal and a blue component video (B) signal, respectively;

first signal decoding circuitry coupled between said first and third input signal electrodes and said first output signal electrode, and responsive to said Y and Pr signals by providing said R signal;

second signal decoding circuitry coupled between said first, second and third input signal electrodes and said second output signal electrode, and responsive to said Y, Pb and Pr signals by providing said G signal; and third signal decoding circuitry coupled between said first and second input signal electrodes and said third output signal electrode, and responsive to said Y and Pb signals by providing said B signal;

wherein said first signal decoding circuitry comprises first voltage divider circuitry coupled to said first and third input signal electrodes, and first amplifier circuitry coupled to said first voltage divider circuitry and said first output signal electrode, said second signal decoding circuitry comprises second voltage divider circuitry coupled to said first, second and third input signal electrodes, and second amplifier circuitry coupled to said second voltage divider circuitry and said second output signal electrode, and said third signal decoding circuitry comprises third voltage divider circuitry coupled to said first and second input signal electrodes, and third amplifier circuitry coupled to said third voltage divider circuitry and said third output signal electrode.

10. The apparatus of claim 9, wherein:

said first amplifier circuitry comprises a first differential amplifier circuit;

said second amplifier circuitry comprises a second differential amplifier circuit; and said third amplifier circuitry comprises a third differential amplifier circuit.

11. An apparatus including circuitry for converting a Y-Pb-Pr component video signal to a R-G-B component video signal, comprising:

first signal decoder means including a first shared scaling means for receiving and decoding jointly via said first shared scaling means a luminance component video (Y) signal and a red color difference component video (Pr) signal and generating a red component video (R) signal;

second signal decoder means including a second shared scaling means for receiving and decoding jointly via said second shared scaling means said Y signal, a blue color difference component video (Pb) signal and said Pr signal and generating a green component video (G) signal; and third signal decoder means including a third shared scaling means for receiving and decoding jointly via said third shared scaling means said Y and Pb signals and generating a blue component video (B) signal.

12. A method for converting a Y-Pb-Pr component video signal to a R-G-B component video signal, comprising:

receiving a luminance component video (Y) signal;
receiving a blue color difference component video (Pb) signal;
receiving a red color difference component video (Pr) signal;
decoding said Y and Pr signals jointly to produce a red component video (R) signal;
decoding said Y, Pb and Pr signals jointly to produce a green component video (G) signal; and
decoding said Y and Pb signals jointly to produce a blue component video (B) signal.

13. A method for converting a Y-Pb-Pr component video signal to a R-G-B component video signal, comprising:

receiving a luminance component video (Y) signal;
receiving a blue color difference component video (Pb) signal;
receiving a red color difference component video (Pr) signal;
decoding said Y and Pr signals to produce a red component video (R) signal;
decoding said Y, Pb and Pr signals to produce a green component video (G) signal; and
decoding said Y and Pb signals to produce a blue component video (B) signal;

wherein
said decoding said Y and Pr signals to produce an R signal comprises jointly scaling said Y and Pr signals with a first shared scaling process,
said decoding said Y, Pb and Pr signals to produce a G signal comprises jointly scaling said Y, Pb and Pr signals with a second shared scaling process, and
decoding said Y and Pb signals to produce a B signal comprises jointly scaling said Y and Pb signals with a third shared scaling process.

14. The apparatus of claim 13, wherein:

said jointly scaling said Y and Pr signals comprises voltage-dividing said Y and Pr signals;
said jointly scaling said Y, Pb and Pr signals comprises voltage-dividing said Y, Pb and Pr signals; and
said jointly scaling said Y and Pb signals comprises voltage-dividing said Y and Pb signals.

15. The apparatus of claim 13, wherein:

said decoding said Y and Pr signals comprises voltage-dividing said Y and Pr signals;
said decoding said Y, Pb and Pr signals comprises voltage-dividing said Y, Pb and Pr signals; and
said decoding said Y and Pb signals comprises voltage-dividing said Y and Pb signals.

* * * * *